Jan. 22, 1952 K. M. OLSEN 2,583,008

ASYMMETRIC ELECTRICAL CONDUCTING DEVICE

Filed April 22, 1948 2 SHEETS—SHEET 1

INVENTOR
K. M. OLSEN
BY
[signature]
ATTORNEY

Jan. 22, 1952 K. M. OLSEN 2,583,008

ASYMMETRIC ELECTRICAL CONDUCTING DEVICE

Filed April 22, 1948 2 SHEETS—SHEET 2

INVENTOR
K. M. OLSEN
BY
[signature]
ATTORNEY

UNITED STATES PATENT OFFICE 2,583,008

ASYMMETRIC ELECTRICAL CONDUCTING DEVICE

Karl M. Olsen, Morristown, N. J., assignor to Bell Telephone Laboratories, Incorporated, New York, N. Y., a corporation of New York Application April 22, 1948, Serial No. 22,627

12 Claims. (Cl. 175—366)

This invention relates to asymmetric electrical conducting devices and more particularly to point contact rectifiers or detectors of the type, such as disclosed in the application Serial No. 638,351, filed December 29, 1945, of Jack H. Scaff and Henry C. Theuerer, including a slab or crystal of a germanium alloy.

One general object of this invention is to improve the operating characteristics of asymmetric conducting devices of the type including a crystal or slab of germanium alloy.

More specifically objects of this invention are to increase the rectification ratio for such devices, to obtain a high reverse resistance therefor, to increase the forward current in a germanium type rectifier or detector and to achieve non-linearity of forward current characteristic over a range of voltages for germanium type detectors.

It has been discovered that the operating characteristics of point contact germanium alloy detectors or rectifiers are dependent to a large extent upon the rectifying junction produced between the contact point and the slab or crystal and that exceptionally advantageous characteristics are obtainable by the use of a contact point of a copper alloy, for example Phosphor-bronze or beryllium-copper. For example, in illustrative devices, rectification ratios of the order of one million at one volt direct current and reverse resistances of the order of 10 to 50 megohms and higher at one volt direct current have been obtained.

It has been discovered also that in point contact rectifiers including a slab or crystal of germanium containing a fraction of a per cent of antimony, definite correlations obtain between the electrical properties of the device and the antimony content and that unusually advantageous properties are realized with slabs or crystals produced from ingots of germanium antimony alloy in which the antimony constitutes between about 0.005 and 0.15 per cent by weight of the total.

The invention and the various features thereof will be understood more clearly and fully from the following detailed description with reference to the accompanying drawing in which.

Figure 6:
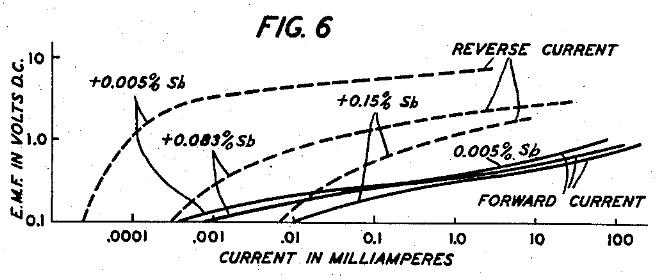
Figure 7:
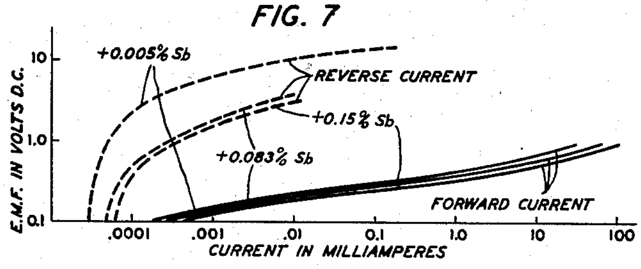
Figure 8:
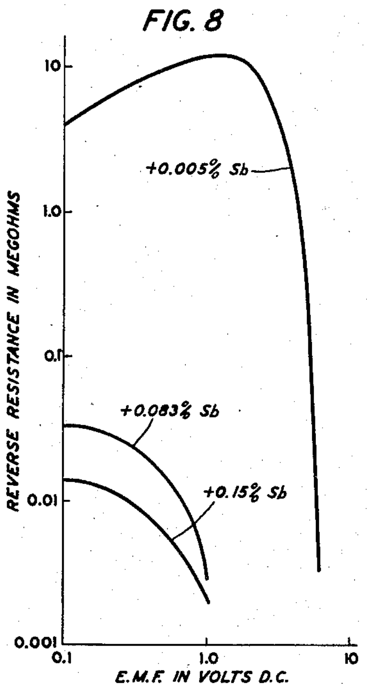
Figure 9:
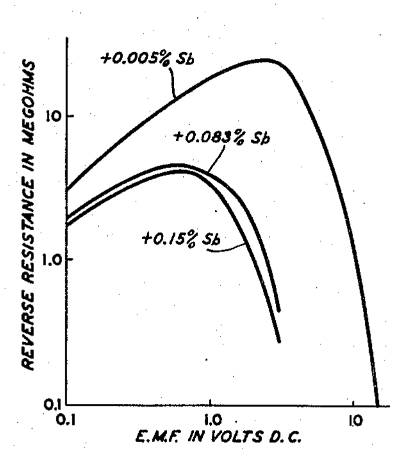

Figs. 6 and 7 are graphs showing the current-voltage characteristics of several devices representative of this invention including slabs cut from different portions of germanium-antimony ingots of various antimony contents; and Figs. 8 and 9 are graphs showing typical reverse resistance characteristics for devices including slabs having current-voltage properties of the forms shown in Figs. 6 and 7.

Figure 1:
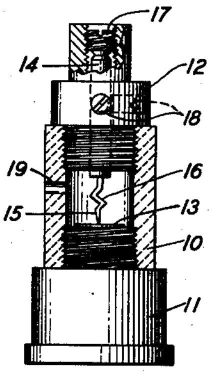
Fig. 1 is an elevational view, partly in section, of a germanium type rectifier illustrative of one embodiment of this invention.

Referring now to the drawing, the asymmetric conducting device illustrated in Fig. 1 comprises a cylindrical insulating, e. g. ceramic, shell 10 internally threaded at opposite ends, and electrically conductive, threaded terminal plugs 11 and 12 screwed into the ends of the shell 10. Seated upon the inner end of the plug 11 is a circular slab or disc 13 of germanium alloy, which may be fabricated as described hereinafter. A stem 14 extends into the terminal plug 12 and carries a contact point 15 which has a spring section 16 therein. The point bears against the slab or disc 13, the bearing pressure of the point upon the disc being determined by a set screw 17 threaded into the plug 12 and abutting the stem 14. The latter may be locked firmly in place to prevent alteration in the contact point to disc pressure, by set screws 18.

After the device has been assembled, the contact spring or point is brought into contact with the slab or disc and then is advanced a preassigned distance to obtain the desired contact point pressure. The device is tapped lightly on the side to minimize the reverse current. Then a direct current of the order of 200 to 300 milliamperes is passed through the unit in the forward direction for a period of the order of fifteen seconds. This electrical treatment markedly increases the 1 volt direct current forward current of the unit without deleteriously affecting the reverse current. Also it stabilizes the electrical characteristics of the device. Finally, the device may be vacuum impregnated with a suitable wax, which may be introduced into the shell by way of an opening 19 therein.

The slab or crystal may be fabricated in the manner described in the application heretofore identified. Briefly, in this method a body of germanium, produced, for example, by reduction of germanium dioxide, is broken into small pieces which are placed in a crucible together with a prescribed amount of an impurity, such as antimony. The charge is melted and the melt is cooled progressively from one end to the other to effect a graduated distribution of the impurity through the mass, the greatest concentration of the impurity being at the end of the mass last to cool. In ingots made as described in the above-identified application wherein the heating is effected by an induction coil encircling the crucible, the cooling may be accomplished by raising the coil at the rate of ⅛ inch per minute while maintaining the power input to the coil constant. Suitable slabs are then obtained from the mass by cutting the latter in planes normal to the axis extending between its ends. If the impurity is such as to result in n-type alloy throughout the mass, the slabs may be used directly. If, however, the impurity is such that p-type material results, the mass or the slabs may be heat treated to convert the material to the n-type. The face of the slab to which point contact is to be made is lapped with a fine abrasive and then etched to produce a very smooth surface.

It has been found, as has been noted heretofore, that exceptionally advantageous operating characteristics are obtainable by the use of a point contact of a copper alloy, for example Phosphor bronze or beryllium copper. For example, for typical stabilized units of the construction illustrated in Fig. 1 and including a slab or crystal 13 .050×.050 inch and .020 inch thick and cut from the bottom section of a germanium-antimony ingot in which the added antimony was 0.083 per cent, and a contact point formed from 0.005 inch wire bearing against the crystal with a pressure of approximately 5 to 15 grams, the forward current $I_F$, reverse current $I_R$ and rectification ratio R, at one volt direct current, both before and after impregnation of the unit with wax, were as given below for a contact point of Phosphor bronze (91.9 per cent copper, 8 per cent tin, 0.1% phosphorous) and of beryllium-copper (97.7 per cent copper, 2.3 per cent beryllium). For comparison purposes, data for a similar unit including a tungsten contact point are given also. The currents are given in milliamperes:

| Contact Material | Before Impregnation | | | After Impregnation | | |
|---|---|---|---|---|---|---|
| | $I_F$ | $I_R$ | R | $I_F$ | $I_R$ | R |
| Tungsten | 34 | .036 | 944 | 38 | .036 | 1,055 |
| Phosphor Bronze | 85 | .0009 | 94,400 | 60 | .0005 | 120,000 |
| Beryllium-Copper | 82 | .0005 | 164,000 | 64 | .0004 | 160,000 |

Other copper alloys also possess advantages as contact point materials. Data for impregnated units of the construction above described, including a slab or crystal cut from the middle section of a germanium-antimony ingot in which the added antimony was 0.005 per cent and 5 mil diameter sheared contact points are given below, together with data for similar units including tungsten and electrolytically formed Phosphor bronze contact points. The currents are given in milliamperes at 1 volt direct current.

| Contact Material | $I_F$ | $I_R$ |
|---|---|---|
| Tungsten | 12.9 | .049 |
| Phosphor Bronze | 43 | .00005 |
| 95% Copper-5% Aluminum | 51 | .00006 |
| 90% Copper-10% Zinc | 46 | .0001 |
| 80% Copper-20% Nickel | 44 | .0001 |
| 97% Copper-3% Silicon | 51 | .00004 |
| 66% Copper-18% Nickel-16% Zinc | 44 | .0001 |

It is evident from the above tables, that copper alloy contact points produce at least a hundred fold increase in rectification ratio over the tungsten points commonly used heretofore. Even greater increases, corresponding to rectification ratios of the order of one million to one, have been obtained.

The exceptionally high ratios appear to be independent of the exact form of the contact point. For units for which data is given above, the contact points were formed by shearing the 5 mil wire at 45 degrees to the length of the wire. Comparable results have been obtained by using Phosphor bronze contact points formed electrolytically using a phosphoric acid electrolyte.

Figure 2:
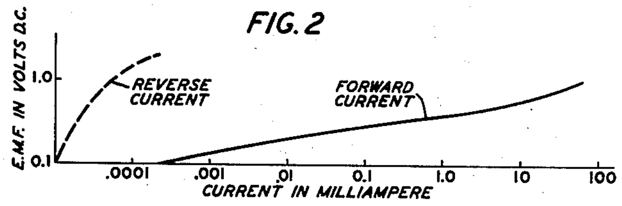
Fig. 2 is a graph showing typical current-voltage characteristics of devices constructed in accordance with this invention.

A direct current characteristic for an illustrative unit of the construction above described, impregnated, and embodying a Phosphor bronze contact point is shown in Fig. 2, in which the coordinates are logarithmic. Particularly notable from Fig. 2 are the high rectification ratio, of the order of $1.15\times10^6$ at one volt, the high degree of non-linearity between 0.1 and 1.0 volt, and the low reverse current.

Because of the exceedingly low reverse current, it will be appreciated that several rectifier units having characteristics such as illustrated in Fig. 2 may be operated in parallel in systems requiring a high forward current but having a fixed restriction upon the permissible reverse current.

Large rectification ratios of the order of magnitude indicated heretofore are obtainable for germanium-antimony alloy slabs or crystals of various specific compositions. The exact characteristics of such devices, it has been found, are dependent largely upon the percentage of the added antimony, within a range of percentages. The nature of the relationships between the operating characteristics and the antimony content will be pointed out hereinafter.

As has been set forth above, in the fabrication of germanium-antimony ingots from which the crystals or slabs are cut, the progressive cooling effects a graduated distribution of the impurity, antimony, throughout the mass. Generally, the direction of the progressive cooling is vertical so that the top of the mass cools last and the greatest concentration of the impurity occurs at the top.

Figure 3:
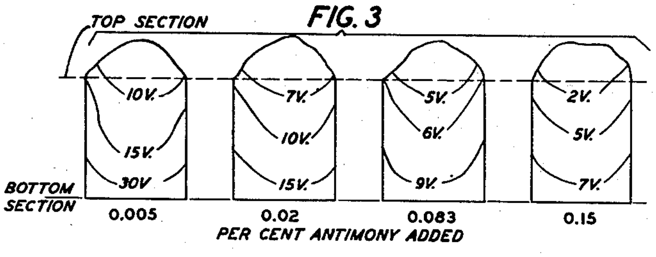
Fig. 3 is a diagram illustrating the peak back voltage properties of several germanium-antimony ingots fabricated in accordance with this invention.

The impurity distribution is indicated qualitatively by the peak back voltage contours of the ingot, which are obtained by probe tests. The voltage contours, determined by probe tests with tungsten point probes, for several ingots of different added antimony content are illustrated in Fig. 3. As is evident from this figure, the peak back voltage decreases as the antimony content increases.

Tests have shown that entirely satisfactory rectifier units cannot be made from the bottom section of ingots including less than .001 per cent added antimony for these sections included areas having ohmic or non-rectifying properties. However, such sections were convertible to n-type rectifying material by appropriate treatment, specifically heating for 24 hours at 500° C. in helium.

The relations between the properties of germanium-antimony rectifiers and the antimony content are illustrated in Figs. 4 to 9, inclusive, which show direct current characteristics for units of the construction illustrated in Fig. 1, impregnated and including contact points of 5 mil Phosphor bronze. In all these figures, the coordinates are logarithmic. Also, each of the curves in Figs. 6 to 9, inclusive, is based upon median values of data for a dozen or more individual rectifiers.

Figure 4:
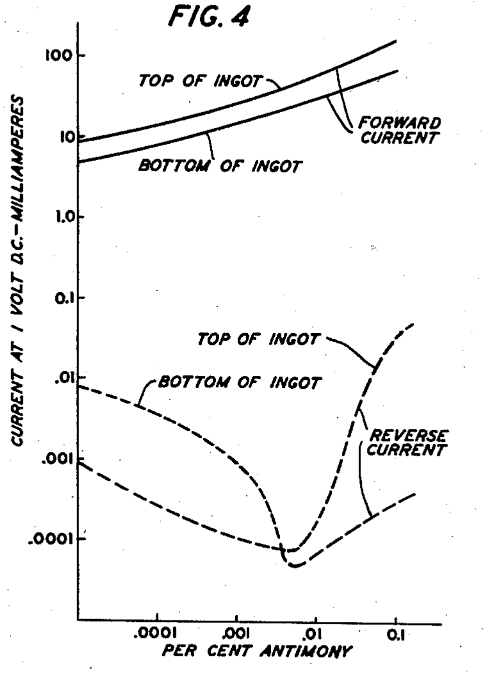
Fig. 4 is a graph indicating the relation between electrical properties and antimony content for slabs cut from different portions of an ingot, of the type illustrated in Fig. 3.

Fig. 4 is based upon a series of slabs or crystals cut from the end quarter sections of ingots and shows the variation of current with amount of added antimony, at one volt direct current. As is evident from this figure, the forward current increases as the antimony content increases, bearing in mind in this connection that, as has been pointed out heretofore, in slabs or crystals obtained from the top portion of an ingot the antimony concentration is greater than in slabs or crystals cut from the bottom of the ingot. The reverse current, however, first decreases then increases as the percentage of added antimony increases, the minimum for both slabs or crystals cut from the top and bottom of the ingot being for an added antimony content of about 0.005 per cent. For slabs or crystals cut from ingots containing from 0.005 to 0.15 per cent antimony, the reverse current is lower for units from the bottom section whereas for ingots containing about 0.001 per cent or less added antimony the reverse current is lower in units cut from the top section.

Figure 5:
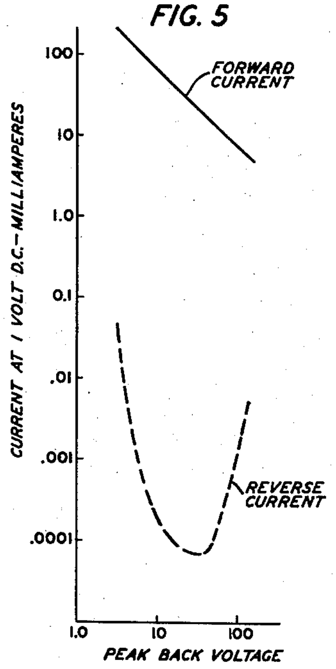
Fig. 5 is another graph illustrating the current and peak back voltage relationships in a germanium-antimony asymmetric conducting device illustrative of this invention.

The properties of such germanium-antimony crystals are related to the peak back voltage of the section of the ingot from which the slabs or crystals are cut, as illustrated in Fig. 5. Higher forward currents are associated with lower peak back voltage compositions and minimum reverse currents are obtained from compositions having peak back voltages of the order of 30 volts, say between 20 and 40 volts.

The direct current characteristics of rectifier units of the construction illustrated in Fig. 1, including Phosphor bronze contact points and slabs or crystals cut from the top quarter section of ingots having antimony of the percentages indicated on the curves added to the germanium are illustrated in Fig. 6. Fig. 7 illustrates, similarly, the characteristics for similar units including slabs or crystals cut from the bottom quarter section of the ingots. It is evident from Figs. 6 and 7 that the lower the antimony content, the higher is the voltage that the unit will withstand in the reverse direction. It is evident further that all the units have exceptionally high rectification ratios. Moreover, as the added antimony content is increased, the forward current for a given voltage increases. Also, the forward current characteristic over limited voltage ranges follows substantially the relation $I=E^x$. Hence, the degree of non-linearity of this characteristic at a given voltage is expressed numerically by the value $x$, which is the reciprocal of the slope for the characteristic (log voltage vs. log current) at that voltage. In Figs. 6 and 7, the greatest slope of the curves occurs for voltages between 0.2 and 0.4 volt. In this voltage range, the value of the exponent $x$ is about 8 for units made from ingots in which the added antimony is between 0.005 and 0.083 per cent. It has been found that for added antimony above and below these percentages, the exponent $x$ is smaller than 8.

Fig. 8 illustrates the reverse resistance-voltage relation in rectifiers having the characteristics shown in Fig. 6. Fig. 9 shows this relation for rectifiers having the characteristics illustrated in Fig. 7. From the curves in Figures 8 and 9, it will be noted that the highest reverse resistance obtainable at a given voltage is dependent upon the added antimony content of the ingot and that for the range of added antimony illustrated, at low voltages, i. e. of the order of one volt or lower, the reverse resistance increases as the per cent antimony decreases. To be noted especially in Figs. 8 and 9 are the very large values of reverse resistance obtainable. For example a rectifier including a slab or crystal cut from the bottom section of an ingot comprising 0.005 per cent added antimony has a reverse resistance of about 25 megohms at 2 volts direct current The forward resistance at this voltage is about 10 ohms. The rectification ratio at this voltage is of the order of $2.5\times10^6$. As another example for a rectifier including a slab or crystal cut from the bottom section of an ingot comprising 0.083 per cent added antimony, at one volt direct current the reverse resistance is about 3.5 megohms, the forward resistance is about 143 ohms and a rectification ratio is about 260,000. As a further example, for a rectifier including a slab or crystal cut from the top portion of an ingot comprising 0.005 per cent antimony, at about 1 volt direct current, the reverse resistance is about 10 megohms, the forward resistance about 143 ohms and the rectification ratio about 900,000.

To recapitulate, it has been discovered that exceptionally high rectification ratios can be realized for germanium-antimony alloy rectifiers by the use of copper alloy contact points and that definite correlation between the electrical properties of such devices and the added antimony content of the ingot from which the slabs or crystals are cut obtains. Specifically, as the added antimony content increases, the reverse current decreases and then increases, the minimum occurring for an antimony content of substantially 0.005 per cent, this being true for slabs or crystals cut from either the top or bottom quarter section of the ingot. A minimum reverse current is realized with slabs or crystals cut from sections of an ingot for which the peak back voltage is of the order of 30 volts. As the added antimony content increases, the forward current increases. In general, the lower the antimony content, the higher is the reverse resistance at low operating voltages. The higher the antimony content, the lower is the voltage at which the maximum reverse resistance occurs. At low voltages, say from 0.2 to 0.4 volt, the greater the antimony content, the greater is the degree of non-linearity of the forward current, the non-linearity being greatest for added antimony between 0.005 and 0.083 per cent.

What is claimed is:

1. The method of making an asymmetric electrical conductor which comprises preparing a melt of germanium and antimony in which the antimony constitutes but a small fraction of one per cent by weight of the total, cooling the melt to effect progressive solidification thereof from one extremity to the other, cutting a slab from the resulting ingot substantially normal to the axis extending between the two extremities of the ingot, making electrical connection to one face of slab, and making a copper alloy point electrical connection to the opposite face of said slab.

2. The method of making an asymmetric electrical conductor in accordance with claim 1 wherein said slab is cut from a section of the ingot for which the peak back voltage as determined by tungsten point probe tests is of the order of 30 volts.

3. The method of making an asymmetric electrical conductor in accordance with claim 1 wherein the antimony constitutes approximately 0.005 per cent by weight of the total of the melt.

4. The method of making an asymmetric electrical conductor which comprises preparing a melt of germanium and antimony in which the antimony constitutes between substantially 0.01 per cent and 0.15 per cent of the total, cooling the melt to effect progressive solidification thereof from one extremity to the other, cutting a slab from the resulting ingot substantially normal to the axis between the two extremities thereof, and establishing electrical connection to opposite faces of the slab.

5. An asymmetric electrical conducting device comprising a body of germanium-antimony alloy in which the antimony constitutes a small fraction of one per cent by weight of the total, an electrode engaging one face of the body, and a copper alloy point contact bearing against the opposite face of the body, the copper content of the alloy contact being between about 92 per cent and about 98 per cent.

6. An asymmetric electrical conducting device in accordance with claim 5 wherein said point contact is of Phosphor bronze of the composition approximately 92 per cent copper and 8 per cent tin.

7. An asymmetric electrical conducting device in accordance with claim 5 wherein said contact point is of beryllium copper of the composition approximately 97.7 per cent copper and 2.3 per cent beryllium.

8. An asymmetric electrical conducting device in accordance with claim 5 wherein the antimony constitutes substantially 0.15 per cent or less by weight of the alloy.

9. An asymmetric electrical conducting device comprising a slab cut from a section of an antimony-germanium ingot at which the peak back voltage is of the order of 30 volts, the antimony content of the ingot being substantially 0.005 per cent by weight, a rectifying connection to said body, and a second connection to said body.

10. An asymmetric electrical conducting device comprising a slab of germanium-antimony alloy in which the antimony constitutes but a small fraction of one per cent by weight of the total, an electrical connection to one face of said slab, and a Phosphor bronze point contact bearing against the opposite face of said slab with a pressure between about 5 and 15 grams.

11. An asymmetric electrical conducting device comprising a slab of germanium having a small fraction of one per cent of an impurity alloyed therewith, a Phosphor bronze contact point bearing against one face of said slab, and an electrical connection to said body at a region spaced from said contact.

12. An asymmetric electrical device comprising a slab of germanium-antimony alloy, the antimony content of said alloy being of the order of 0.005 per cent by weight, a copper alloy contact point containing between about 92 per cent and about 98 per cent copper bearing against one face of said slab, and an electrical connection to said slab at a region spaced from said contact point.

KARL M. OLSEN.

REFERENCES CITED

The following references are of record in the file of this patent:

UNITED STATES PATENTS

| Number | Name | Date |
|---|---|---|
| 2,514,879 | Lark-Horovitz et al. | July 11, 1950 |
| 2,530,110 | Woodyard | Nov. 14, 1950 |

OTHER REFERENCES

Merritt: Proc. Natl. Academy of Science, vol. 11 (1925), pages 743–748.

North: J. Applied Physics, vol. 17 (November 1946), pages 912–923.

Whaley et al.: N. D. R. C. Report 14—341 (November 1, 1944), declassified December 14, 1945, pages 1–15.